United States Patent [19]
Chen et al.

[11] Patent Number: 5,118,395
[45] Date of Patent: Jun. 2, 1992

[54] OXYGEN RECOVERY FROM TURBINE EXHAUST USING SOLID ELECTROLYTE MEMBRANE

[75] Inventors: Michael S. Chen, Zionsville; William P. Hegarty, Allentown; William A. Steyert, deceased, late of Center Valley, all of Pa., by Lila O. Steyert, executrix

[73] Assignee: Air Products and Chemicals, Inc., Allentown, Pa.

[21] Appl. No.: 529,093

[22] Filed: May 24, 1990

[51] Int. Cl.$^5$ ............................................. G01N 20/26
[52] U.S. Cl. ................................. 204/59 R; 204/424; 204/295; 204/182.3; 55/2
[58] Field of Search .................. 204/296, 182.3, 295, 204/424, 59 R; 55/16

[56] References Cited

U.S. PATENT DOCUMENTS

| | | | |
|---|---|---|---|
| 2,540,151 | 2/1951 | Wellen et al. | 183/115 |
| 3,400,054 | 9/1968 | Ruka et al. | 204/1 |
| 3,713,271 | 1/1973 | Franz et al. | 55/16 |
| 3,930,814 | 1/1976 | Gessner | 55/16 |
| 4,131,514 | 12/1978 | Chong et al. | 204/129 |
| 4,132,766 | 1/1979 | Erickson | 423/579 |
| 4,174,955 | 11/1979 | Blackmer et al. | 55/158 |
| 4,198,213 | 4/1980 | Mannatt | 55/16 |
| 4,224,045 | 9/1980 | Olszewski et al. | 62/30 |
| 4,340,578 | 7/1982 | Erickson | 423/579 |
| 4,382,366 | 5/1983 | Gessner | 62/31 |
| 4,545,787 | 10/1985 | Hegarty | 55/16 |
| 4,547,277 | 10/1985 | Lawless | 204/252 |
| 4,560,394 | 12/1985 | McDonald et al. | 55/16 |
| 4,659,448 | 4/1987 | Gordin | 204/277 |
| 4,713,152 | 12/1987 | Walsh | 204/130 |
| 4,725,346 | 2/1988 | Joshi | 204/242 |
| 9,330,633 | 5/1982 | Yoshisato et al. | 501/152 |

FOREIGN PATENT DOCUMENTS

| | | | |
|---|---|---|---|
| 8702593 | 5/1987 | European Pat. Off. | |
| 56-92103 | 7/1981 | Japan | |
| 56-41939 | 10/1981 | Japan | 204/424 |

OTHER PUBLICATIONS

Beaver et al., "Inert Gas Generation Systems for Offshore Platforms." *Energy Progress* vol. 6, No. 3, p. 149, (1986).

Yuan and Kroger; Stabilized Zirconium As An Oxygen Pump; *J. Electrochem. Soc.;* pp. 594–600; May 1969.

Takahashi and Iwahara; Oxide Ion Conductors Based On Bismutzsesquioxide; *Mat. Res. Bull.;* vol. 13; pp. 1447–1453; 1978.

Gur and Huggins; Decomposition of Nitric Oxide Using Solid State Electrolyte; *Fast Ion Transporting Solids;* pp. 109–112; 1979.

Primary Examiner—John Niebling
Assistant Examiner—Bruce F. Bell
Attorney, Agent, or Firm—Geoffrey L. Chase; James C. Simmons; William F. Marsh

[57] ABSTRACT

A process is provided for extracting high purity oxygen from gas turbine exhaust streams by passing the gas turbine exhaust over the feed side of solid electrolyte membrane selective to the permeation of oxygen over other components of the exhaust stream to separate the oxygen from the exhaust stream, and removing the oxygen product stream from the permeate side of the membrane.

19 Claims, 2 Drawing Sheets

OXYGEN RECOVERY FROM TURBINE EXHAUST USING SOLID ELECTROLYTE MEMBRANE

TECHNICAL FIELD

This invention relates to a method for recovering high purity oxygen from the exhaust of a power generating gas turbine using a high temperature solid electrolyte membrane.

BACKGROUND OF THE INVENTION

The separation of gas streams, most notably air, into constituent components such as oxygen and nitrogen has been practiced for many years utilizing energy intensive processes for the recovery of various purities and volumes of the gas product. Chemical and/or physical adsorption of individual gas components, fractional cryogenic distillation of various gas components, and differential permeation through membrane media have all been practiced to recover components of gas streams and particularly to recover oxygen and/or nitrogen from air. These processes generally suffer from high utility costs or the lack of continuous or convenient regeneration or operation.

Various processes for separating gas streams, such as air, have been suggested in which at least some power is recovered from an effluent stream to provide a portion of the power requirements of the process itself.

For example, U.S. Pat. No. 4,132,766 describes a chemical air separation process wherein air, at elevated temperature and pressure, is separated into oxygen and nitrogen-rich waste streams by preferential chemical binding of oxygen from the air. The nitrogen-rich stream is then reduced in pressure through an expander before being vented. The expander drives the compressor to recover some power for the process.

To provide additional power for the operation of compression equipment in a gas separation process, U.S. Pat. No. 4,340,578 suggests that in a chemical air separation plant, the waste nitrogen stream, still containing residual oxygen, is combusted with a fuel. The hot effluent is then expanded in several stages through turbines and power is recovered.

Alternately, U.S. Pat. No. 4,560,394 discloses that air may be compressed in a compressor, reduced in temperature by heat exchange against process streams or external cooling means and then separated into oxygen and a nitrogen-rich effluent stream by passage over a semipermeable membrane. While some power is recovered by pressure reduction of the nitrogen-rich stream, no fuel is combusted and no net power is produced.

Power generation can be achieved using a cryogenic air separation process as described in U.S. Pat. No. 4,224,045. In that process, air is compressed and then cooled to its liquefaction temperature before being distilled through a fractionation column. The waste stream from the column is rewarmed, recompressed, and then combusted with fuel and by-pass air. The combusted effluent is expanded through a turbine to recover power for the process.

U.S. Pat. No. 4,545,787 teaches a method for the generation of net power and the recovery of by-product oxygen-rich gas at low power requirements. Air is compressed to an elevated temperature and pressure. At least a portion of the air is combusted and a portion of the oxygen is removed from the air or combustion effluent through a membrane or adsorbent before the oxygen-lean combustion effluent is expanded through a turbine to recover power for the process and net power. While this system is attractive, it is not always possible to include such an oxygen extraction device without substantial modification of the gas turbine construction and degradation in power generation performance. This is particularly true where the retrofitting of an existing simple gas turbine having no external combuster is required.

SUMMARY OF THE INVENTION

The present invention provides a process for recovering high purity oxygen from hot gas turbine exhaust gases at low capital cost and with low energy requirements which comprises passing a gas turbine exhaust stream over the feed side of a solid electrolyte membrane cell system and recovering high purity oxygen from the permeate side of the membrane and resulting in an oxygen-depleted exhaust gas stream.

The process of the invention is an improvement over prior processes which normally generate power through combustion of fuel and compressed air with expansion of the combusted gas in a turbine. The invention comprises passing a hot gas turbine exhaust stream which preferably has a temperature ranging from about 850° to 1800° F. (454° to 985° C.), an exhaust pressure ranging from about 0.2 to 100 psig (0.01 to 7 atm gauge), and an oxygen content ranging from about 5 to 18% by volume over the feed side of a solid electrolyte membrane selective to the permeation of oxygen over other gaseous components, preferably at a membrane temperature ranging from about 1000° to 2000° F. (535° to 1100° C.) and a feed pressure ranging from about 0.2 to 100 psig (0.01 to 7 atm gauge) to separate the oxygen from the exhaust gas stream, and removing the oxygen product stream from the permeate side of the membrane.

In one embodiment, the gas turbine exhaust stream is heated before it is passed over the solid electrolyte membrane and/or the solid electrolyte membrane is heated by post combustion with additional fuel injection in the exhaust duct of the gas turbine. The heat can be recovered to make steam.

DETAILED DESCRIPTION OF THE INVENTION

Figure 1:
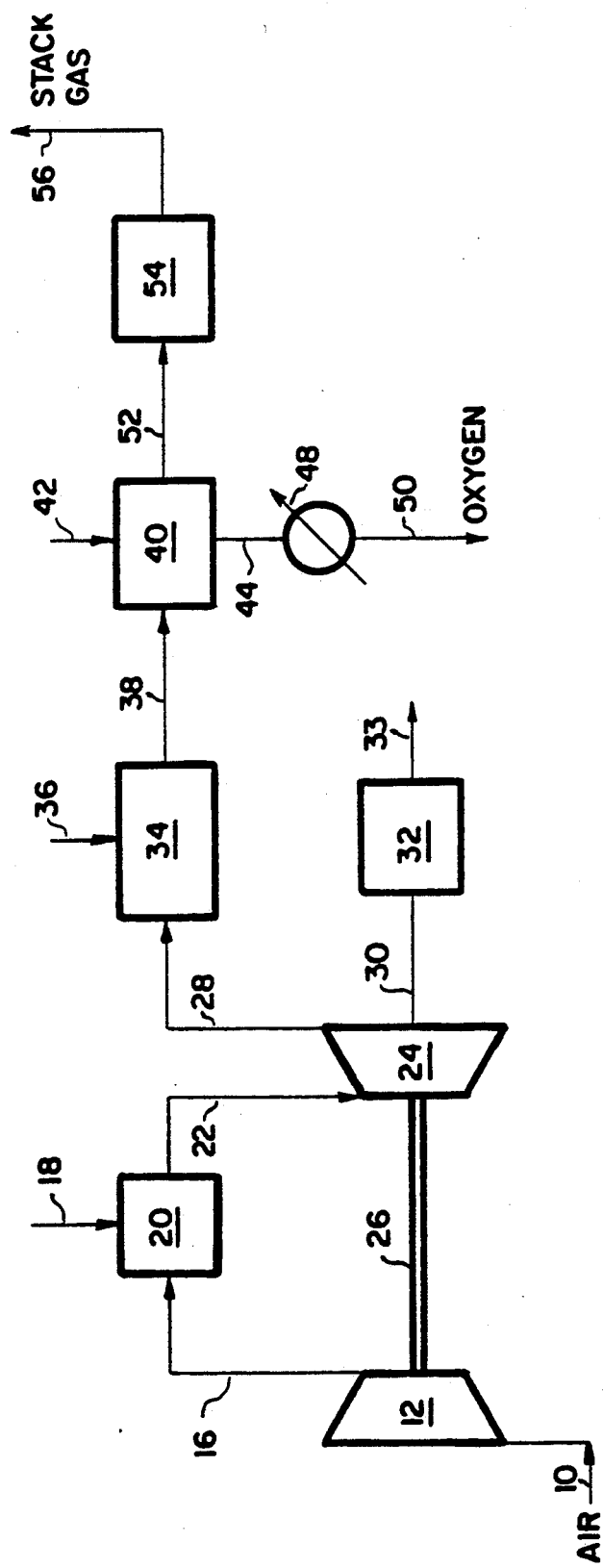
FIG. 1 is a schematic representation of the processes of the invention.

In any method for the generation of power in a combustion turbine and for the production of an oxygen-enriched by-product in which an air stream is compressed to an elevated pressure and temperature preceding the turbine and combusted, at least in part, with a fuel stream to provide a combustion product stream which is expanded through the turbine to provide air compression power, the improvement of the invention provides a treatment for the exhaust gas stream or effluent which comprises passing the exhaust or effluent over the feed side of a solid electrolyte membrane (SEM) cell selective to the permeation of oxygen over other gaseous components, separating oxygen from the exhaust or effluent with the SEM cell, and recovering high purity oxygen gas from the permeate side of the membrane. The oxygen-depleted stream can then be fed to a heat recovery system to produce steam to generate additional net power. Thus, the present invention provides an improvement over prior processes such as those disclosed in U.S. Pat. No. 4,545,787, for example.

The solid electrolyte membrane (SEM) cell used in the invention is a solid electrolyte thin film or membrane with high oxygen ion conductivity and low electron conductivity. The SEM can be a membrane of any desired configuration such as flat, tubular, honeycomb, and the like, situated between two electrodes positioned to apply external voltage across the membrane or film surface and multiple (two or more) cells can be connected in series or in parallel. These are referred to herein as electrode SEMs. Such SEMs are used where the partial pressure of oxygen on the feed side is lower than that on the permeate side.

Alternatively, the SEM can comprise a solid electrolyte thin film or membrane of any desired configuration as described above but made of mixed conductors with mixed conductivity of oxygen ion and electrons which functions without electrodes and without externally applied voltage. These electrodes are referred to herein as electrodeless SEMs. Such SEMs are used where the partial pressure of oxygen on the permeate side is lower than that on the feed side. The lower permeate side pressure is generally maintained by pulling a vacuum on the permeate side. The electrodeless SEM has the particular advantage of eliminating the complexity, cost and over-potentials loss generally associated with electrodes and connectors used in an electrode SEM cell.

The solid electrolyte membrane cells of the invention are preferably installed in the gas turbine exhaust duct between the gas turbine and the downstream heat recovery steam generation (HRSG) system. When the gas turbine exhaust stream is to be heated prior to being permeated through the membrane, a supplemental burner is used in the gas turbine system. The SEM cells are then located downstream of the burner to take advantage of the extra heating of the turbine exhaust gas to reduce the membrane area requirement because oxygen ion conductivity increases with increasing temperature. This is a preferred but not critical installation for the operation of the invention.

The membranes of the invention are also capable of decomposing NOx and SOx compounds. Since the typical fired gas turbine produces substantial NOx emissions, this invention is particularly useful for abating NOx in those areas in which it is a serious concern such as, for example, in California.

In one embodiment of the invention, an oxygen ionic potential is maintained on the cell by applying DC power on electrodes through an external circuit in an electrode SEM cell or, in another embodiment, by applying a vacuum on the permeate side of an electrodeless SEM cell. In a further embodiment of the invention, the exhaust gas stream or effluent is fed through a heater to increase its temperature before it is permeated through the selective SEM. A sweep gas, such as an inert gas, can be conducted over the permeate side of the membrane to lower the oxygen partial pressure and enhance the permeation of oxygen through the membrane.

The present invention can be used to provide an economical means to recover by-product oxygen from a gas turbine system, particularly from gas turbine exhaust. Gas turbine exhaust treated in accordance with the invention generally has an exhausted gas temperature of from about 850° to about 1800° F. (454° to 985° C.), an exhausted gas pressure of from about 0.2 to about 100 psig (0.01 to 7 atm gauge), and contains from about 5 to about 18 volume % oxygen. By-product oxygen can be produced from gas turbine exhaust without significantly affecting the upstream gas turbine construction and power generation efficiency or the downstream heat recovery steam generation (HRSG) system because the amount of oxygen extracted and pressure drop through the SEM cell system are both small.

In a preferred system, the solid electrolyte membrane is operated at a temperature of from about 1000° to about 2000° F. (535° to 1100° C.) for a gas turbine exhaust gas feed pressure of from about 0.2 to about 100 psig (0.07 to 7 atm gauge). Preferably, the solid electrolyte membrane cell is installed in the exhaust duct of a power generating system between a supplemental burner and a HRSG system as shown in FIG. 1 to take advantage of additional heating by post combustion of the gas turbine exhaust gases with additional fuel injection in the exhaust duct. Heat can be recovered to make steam and oxygen. Recoveries of from about 2 to about 80% at high purity are readily achieved.

In one preferred embodiment, oxygen by-product is produced by utilizing an electrode SEM cell comprising a thin solid electrolyte film sandwiched by two electrodes. Oxygen molecules on the feed side of the unit are electrochemically dissociated into oxygen ions on the cathode. The ions are then transported across the matrix of solid electrolyte film by the applied voltage and recombined to form oxygen molecules on the anode. Electrons are conducted through an external electric circuit and a direct power source.

Multiple (two or more) units can be connected in series or in parallel and a unit or cell can have any desired configuration such as a pancake, tube, honeycomb, disc, or the like.

The SEM units or cells can be constructed of any suitable solid electrolyte materials, or mixtures thereof, which are capable of transporting oxygen ions at high temperatures (e.g. 1000°-2000° F. [535°-1100° C.]). By applying an external power input through electrodes and an electric circuit, the ionic nature of the membrane allows it to transport or "pump" oxygen from a region of low partial pressure to a region of higher pressure. The selectivity of such membranes for oxygen is very high because the ionic transport mechanism would not be operative for other combustion gas components.

Examples of some such solid electrolyte materials which may be used include bismuth oxide, zirconia, and the like doped with various oxides such as yttria, calcia, barium oxides, and the like. Preferably bismuth oxide doped with calcia is used. Most preferably, bismuth sesquioxide-based materials are used because they have very high ionic conductivities. Any suitable electrode materials having high electronic conductivity as well as high oxygen transport properties can be used such as, for example, silver, platinum, lanthanum-strontium-magnesium oxide (LSM), lanthanum-strontium-cobalt oxide (LSC), and the like. Preferably, LSM oxides are used for their high conductivities and thermal compatibilty with the solid electrolyte materials.

The electrolyte membrane can have any suitable thickness, preferably in the range of from about 10 to 1000 micrometers, most preferably 20 to 100 microns, and can have any suitable oxygen conductivity such as, for example, conductivities in the range of about 0.01 to 2 ohm$^{-1}$ cm$^{-1}$, preferably 0.5 to 1 ohm$^{-1}$ cm$^{-1}$. The electrodes can have any suitable thickness and can be situated on either side of the electrolyte membrane. The electrodes are preferably porous and operated at any suitable current density, preferably ranging from about 0.05 to 2 amperes/cm$^2$, most preferably 0.5 to 1 ampere/cm$_2$.

Solid electrolyte membrane cells can also decompose NOx and SOx simultaneously as noted hereinbefore, making them valuable as emission abatement devices. Suitably doped $ZrO_2$ and $Bi_2O_3$ membranes are preferred for this application.

In another preferred embodiment of the invention, by-product oxygen can be produced from the gas turbine exhaust by utilizing an electrodeless SEM cell composed of a thin solid electrolyte film without electrodes. Suitable solid electrolyte materials can be any mixed conductors having high oxygen ionic and electronic conductivities such as Co-Sr-Bi, Co-La-Bi, Co-Sr-Ce, Co-La-Ce oxides, and the like, with oxygen ionic conductivities in the range of about 0.01 to 1 ohm$^{-1}$ cm$^{-1}$ and electronic conductivities in the range of about 1 to 30 ohm$^{-1}$ cm$^{-1}$, most preferably with ionic conductivities in the range of about 0.5 to 1 ohm$^{-1}$ cm$^{-1}$ and electronic conductivities in the range of about 10 to 25 ohm$^{-1}$ cm$^{-1}$ Electrodeless SEM cells are preferably operated by maintaining an oxygen pressure on the feed side such that a positive driving force for oxygen ion transport can be achieved in the absence of an externally applied voltage and power source. The electrons released at the anode would flow back to the cathode side through the mixed conductor film itself without going through electrodes and an external electrical circuit. One particular advantage of such a cell is a significant reduction in over-potential loss associated with electrode SEM cell systems.

Referring now to the figures which illustrate preferred embodiments, it can be seen from FIG. 1 that air 10 is compressed by a compressor 12 to produce compressed air 16 which is fed to combustor 20 with fuel 18. Combusted gas 22 is then expanded through gas turbine 24 to yield exhaust gas 2B. Part of the mechanical energy produced by the gas turbine is transmitted through shaft 26 to drive air compressor 12 and part of the energy is transmitted through shaft 30 to generator 32 to produce net power 33. One such system is described in U.S. Pat. No. 4,545,787, the disclosure of which is hereby incorporated by reference.

For a typical frame 5 GE gas turbine system, net power is about 22,340KW, and the exhaust gas, having an oxygen content of about 16 mol %, has a gas flow rate of about 31,945 lb-mol per hour (14,490 kg-mol/hr), a temperature of about 939° F. (503° C.), and a pressure of about 14 inches of water gauge (0.034 atm gauge). Generally, gases having oxygen contents in the range of about 10 to 20%, preferably 15 to 18% can be treated at any flow rate at temperatures in the range of about 800° to 2400° F. (427°-1316° C.), preferably 1300° to 2000° F. (704°-1093° C.), and at pressures in the range of from about 1 to 50 inches of water gauge (0.0025-0.123 atm gauge), preferably 5 to 25 inches of water gauge (0.012-0.061 atm gauge). Gas turbine exhaust containing 16-18% free oxygen at high temperatures is readily available for the coproduction of oxygen without the need for extra air compression.

For steam generation, exhaust gas 28 is directed through an exhaust duct with supplemental burner 34 firing fuel gas 36 using a minor amount of contained oxygen. The temperature of exhaust gas 38 rises to about 1400° F. (760° C.). This gas has a flow of about 32,305 lb-mol/hr (14,654 kg-mol/hr) and contains about 13.6% oxygen.

Figure 2:
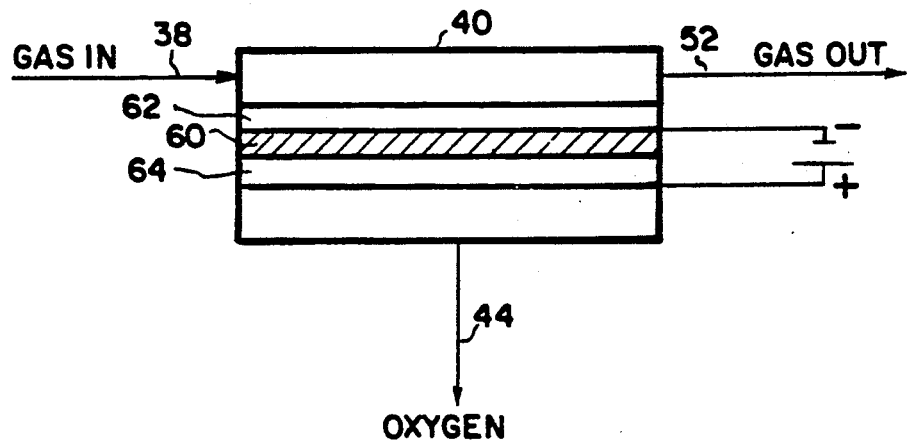
FIG. 2 is a schematic representation of a solid electrolyte membrane cell having electrodes and externally applied voltage for oxygen pumping which can be used in the practice of the invention.

Solid electrolyte membrane cell 40 installed in the exhaust duct, extracts oxygen at the rate of about 260 lb-mol/hr (118 kg-mol/hr) or 5.9% of contained oxygen from stream 38. As more particularly shown in FIG. 2 for one preferred electrode system, cell 40 contains a solid electrolyte membrane of bismuth oxide doped with calcia in the form of a sheet or film 60 having an area of 13,613 ft$^2$ (1265 m$^2$) and a thickness of about 50 microns. The membrane is sandwiched between cathode and anode electrodes, 62 and 64 respectively, and at about 1 ampere/cm$^2$ has an oxygen conductivity of 1 ohm$^{-1}$ cm$^{-1}$. Again referring to FIG. 1, the extraction and pumping of oxygen from 0.133 atm to 1.04 atm across the membrane is effected by means of power source 42 with about 1340KW of input power.

Pure oxygen permeate stream 44 is cooled through a series of heat exchangers 46 by generating steam 48 to yield an oxygen product 50 equivalent of 100 short tons per day (90.8 metric tons/day).

Oxygen-depleted or exit stream 52 is passed on to heat recovery steam generator 54. Exhaust stream 56 goes to the stack at a gas flow rate of 32,045 lb-mol/hour (14,536 kg-mol/hr).

Total power consumption for the 100ST/D oxygen production in this preferred embodiment, calculated at about 1374KW, includes 34KW of a small power penalty due to about a 1 inch water (0.0025 atm) pressure drop of the membrane unit in the duct and about 670KW power loss due to electrode over-potentials. Thus, power per short ton of oxygen is about 330KWH. This compares favorably with 250-300KWH/ton oxygen required for a large, modern, efficient, low pressure, cryogenic oxygen plant. It also provides advantages over the system described, for example, in U.S. Pat. No. 4,545,787 since it extracts oxygen from the gas turbine exhaust at low pressure instead of from the hot gas at high pressure upstream of the turbine. Further, it accomplishes this without much effect on turbine construction and operation. It has the further advantage of easy retrofit with any simple gas turbine system with no external combustors. The invention also enjoys an overall cost advantage for oxygen coproduction with power generation over prior art stand-alone oxygen plants which require dedicated air compressors, heat exchangers, and the like.

Figure 3:
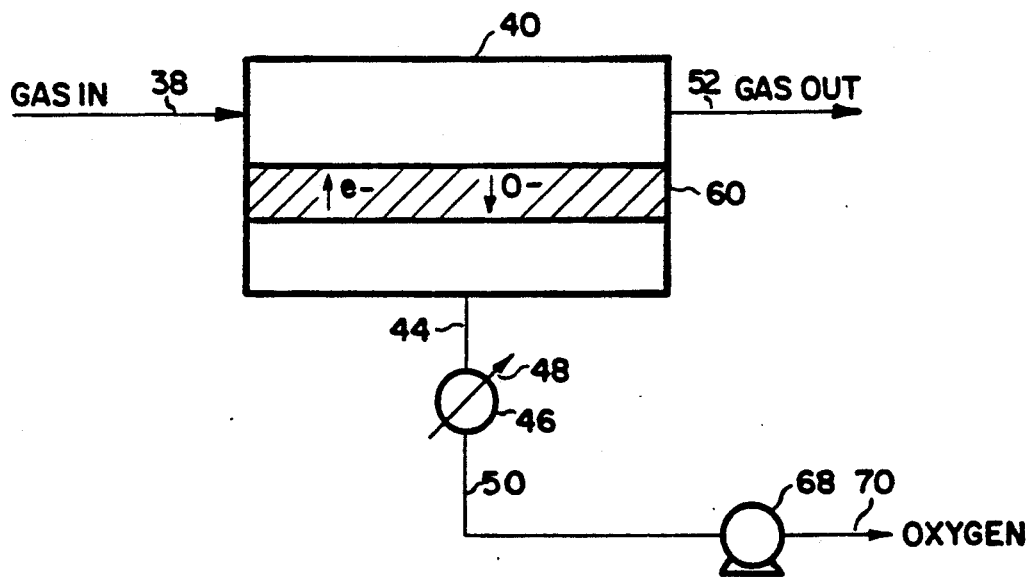
FIG. 3 is a schematic representation of a solid electrodeless electrolyte membrane cell with mixed conductors to effect both oxygen ion and electron transport across the membrane in opposite directions which can be used in the practice of the invention.

In another preferred embodiment of the invention, oxygen is extracted from gas turbine exhaust gas using an electrodeless SEM cell as illustrated in FIG. 3. As shown in FIG. 3, a preferred electrodeless SEM cell 40 containing Co-La-Bi mixed conductors as the electrolyte in the form of a sheet or film 60 having a total area of 13,613 ft$^2$ (1265 m$^2$) and a thickness of 50 microns has an oxygen ionic conductivity of 0.15 ohm$^{-1}$ cm$^{-1}$ and an electronic conductivity of 25 ohm$^{-1}$ cm$^{-1}$ at 1 ampere per cm$^2$. The extraction of oxygen at 260 lb-mol per hour (118 kg-mol/hr) is effected by using vacuum pump 6B to pull a vacuum to about 0.03 atm on the cooled pure oxygen permeate gas 50 such that a positive driving force of oxygen partial pressure is maintained from cathode to anode. Since the electrolyte possesses high electronic conductivity, the electrons released at the anode spontaneously flow back through the membrane from anode to cathode.

The total power consumption for the electrodeless SEM and vacuum pump is estimated to be about 665KW, including a small power penalty due to pressure drop of gas flowing through the SEM cell and a much smaller power loss of over-potential at electrolyte interfaces due to the absence of electrodes. The specific power for 100 short tons per day of oxygen extraction is calculated to be about 160KWH per ton of oxygen, which compares favorably with conventional cryogenic air separation plants.

Variations in the configuration of the preferred embodiment discussed above can be made without detracting from the efficiency of the system. For example, oxygen-depleted stream 52 can also be used to preheat compressed air 16 in a recuperator prior to feeding it to combustor 20 instead of feeding it to the heat recovery steam generating system 54.

Thus, in any method for the generation of power in a combustion turbine and for the production of an oxygen-enriched by-product in which an air stream is compressed to an elevated pressure and temperature preceding the turbine and combusted, at least in part, with a fuel stream to provide a combustion product stream which is expanded through the turbine to provide air compression power, the improvement of the invention provides a treatment for feeding the exhaust or effluent through a heater to increase its temperature, passing the heated exhaust or effluent over the feed side of a solid electrolyte membrane selective to the permeation of oxygen over other gaseous components while an oxygen ionic potential is maintained either by applying a DC power on electrodes through an external circuit in an electrode SEM cell or by applying vacuum on the permeate side of an electrodeless SEM cell to extract oxygen from the exhaust or effluent and recovering high purity oxygen gas from the permeate side of the membrane. The oxygen-depleted stream is fed to a heat recovery system to produce steam to generate additional net power.

The present invention provides an attractive method for oxygen coproduction in a gas turbine system with a very reasonable consumption and overall equipment cost. Added benefits include NOx and other pollutant decomposition in the process.

Although the invention has been described in considerable detail in the foregoing, it is to be understood that such detail is solely for the purpose of illustration and that variations may be made by those skilled in the art without departing from the spirit and scope of the invention except as set forth in the claims.

What is claimed is:

1. A process for oxygen coproduction and net power generation, comprising: combusting a fuel with air to produce a combustion product stream, expanding the combustion product stream through a power generating turbine, generating power and recovering oxygen from a resulting about 850° to about 1800° F. temperature and about 0.2 to about 100 psig pressure gas turbine exhaust stream which contains from about 5 to about 18% by volume of oxygen, which comprises passing the exhaust stream over a feed side of a solid electrolyte membrane selective to the permeation of oxygen over other components of the stream to separate oxygen from the exhaust stream, and removing the oxygen from the permeate side of the membrane.

2. The process of claim 1 wherein the gas turbine exhaust stream passes over a solid electrolyte membrane having a temperature of from about 1000° to about 2000° F.

3. The process of claim 2 wherein from about 2 to about 80% of the oxygen in the gas turbine exhaust stream is recovered.

4. The process of claim 2 wherein the oxygen ionic potential is maintained on the membrane by situating the membrane between two electrodes positioned to apply external voltage across the membrane surface.

5. The process of claim 4 wherein the partial pressure of oxygen on the feed side of the membrane is lower than that on the permeate side of the membrane.

6. The process of Clam 4 wherein a current density of 0.05 to 2 amperes/cm2 is applied across a 10 to 1000 micron thick solid electrolyte membrane.

7. The process of claim 4 wherein the exhaust gas stream contacts two or more membranes.

8. The process of claim 7 wherein the membranes are connected in series or parallel.

9. The process of claim 2 wherein the membrane is made of mixed conductors with mixed conductivity for oxygen ions and electrons.

10. The process of claim 9 wherein the partial pressure of oxygen on the permeate side is lower than that on the feed side.

11. The process of claim 2 wherein an oxygen-depleted exhaust stream is fed through a heat recovery system.

12. The process of claim 2 wherein the gas turbine exhaust stream contacts a doped zirconia membrane for separation of oxygen.

13. The process of claim 2 wherein the gas turbine exhaust stream passes over a doped bismuth oxide membrane for separation of oxygen.

14. The process of claim 2 wherein the gas turbine exhaust stream passes over a Co-Sr-Bi oxide mixed conductor membrane for separation of oxygen.

15. The process of claim 2 wherein the gas turbine exhaust stream passes over a Co-La-Bi oxide mixed conductor membrane for separation of oxygen.

16. The process of claim 2 wherein the gas turbine exhaust stream passes over a Co-Sr-Ce oxide mixed conductor membrane for separation of oxygen.

17. The process of claim 2 wherein the gas turbine exhaust stream passes over a Co-La-Ce oxide mixed conductor membrane for separation of oxygen.

18. The process of claim 2 which comprises heating the gas turbine exhaust stream before passing it over the solid electrolyte membrane.

19. The process of claim 1 which comprises passing a sweep gas over the permeate side of the membrane.

* * * * *